UNITED STATES PATENT OFFICE.

BENNO HOMOLKA, OF FRANKFORT-ON-THE-MAIN, GERMANY, ASSIGNOR TO THE FARBWERKE, VORMALS MEISTER, LUCIUS & BRUNING, OF HÖCHST-ON-THE-MAIN, GERMANY.

BLUE BASIC DYE AND PROCESS OF MAKING SAME.

SPECIFICATION forming part of Letters Patent No. 649,727, dated May 15, 1900.

Application filed February 28, 1899. Serial No. 707,188. (Specimens.)

*To all whom it may concern:*

Be it known that I, BENNO HOMOLKA, Ph. D., a citizen of the Empire of Austria-Hungary, residing at Frankfort-on-the-Main, Germany, have invented certain new and useful Improvements in the Manufacture of Blue Basic Dyestuffs Soluble in Water, of which the following is a specification.

By the American Patent No. 524,252, of August 7, 1897, and the German Patents Nos. 85,932 and 92,015 a series of peculiar blue dyestuffs soluble in water has become known which are obtained if such diazo compounds as result from the action of nitrous acid upon asymmetric dialkylsafranins are allowed to act upon beta-naphthol, whereby safranin and beta-naphthol are employed in molecular quantities. I have found that diazo compounds obtained from asymmetric dialkylsafranins likewise act upon beta-naphthol under certain conditions in such a manner that two molecules of diazotized dialkylsafranin combine with one molecule of beta-naphthol. The compounds thus obtained are blue basic dyestuffs soluble in water which surpass in fastness to washing and alkalies the above-mentioned dyestuffs obtained by combining one molecule of diazotized dialkylsafranin with one molecule of beta-naphthol.

As primary material for the practical carrying out of my process I recommend the technical asymmetric dialkylsafranins as manufactured now by anilin works on a large scale and used in the dye industry under various names—such as "methylenviolet," "clematin," "girofié," "heliotrope," &c. These are chiefly, from a chemical point, asymmetric dimethylsafranins and asymmetric diethylsafranins resulting from oxidizing the mixtures of dimethyl-para-phenylendiamin or diethyl-para-phenylendiamin with anilin, soluidin, or xylidin, or with mixtures of these bases. (*Vide* Schulz and Julius, *Tabellarische Uebersicht der Künstl. Organ. Farbstoffe*, Berlin, 1897, p. 182.)

I illustrate my process by the following examples: Sixteen parts, by weight, of asymmetric diethylphensafranin (two molecular proportions) are dissolved in one thousand parts, by weight, of water. This solution is diazotized in the usual manner at a temperature of 10° to 15° centigrade, with 8.62 parts, by weight, of hydrochloric acid of 21° Baumé and 2.76 parts, by weight, of sodium nitrite (NaNO$_2$) of one hundred per cent. of strength. To the blue diazo solution thus obtained is run, while well stirring, an alkaline solution of beta-naphthol sodium obtained by dissolving three parts, by weight, of beta-naphthol (one molecular proportion) in 3.8 parts, by weight, of soda-lye (specific weight 1.437) and two hundred parts, by weight, of water. The formation of the dyestuff is complete after several hours' standing. It is then heated with steam to 60° to 70° centigrade. The dyestuff is precipitated with common salt and some chlorid of zinc, then filtered, pressed, and dried.

In many cases it is preferable yet not indispensable to carry out the formation of the dyestuff in presence of organic acids, and then one proceeds as follows: Sixteen parts, by weight, of asymmetric dimethylphensafranin, zinc double salt, (two molecular proportions,)

$$(C_{20}H_{19}N_4Cl)_2ZnCl_2$$

are dissolved in water and converted with 8.62 parts, by weight, of hydrochloric acid (21° Baumé) and 2.76 parts, by weight, of sodium nitrite of one hundred per cent. of strength (two molecular proportions) into the diazo compound, as above described. To this solution is added ten parts, by weight, of sodium acetate, and then is run in while well stirring an aqueous solution of beta-naphthol sodium, which is obtained by dissolving three parts, by weight, of beta-naphthol (one molecular proportion) in two parts, by weight, of soda-lye (specific weight 1.437) and one hundred parts, by weight, of water. It is then worked as in the first example.

Instead of naphthol sodium, also finely-divided beta-naphthol may be employed as obtained by treating an alkaline beta-naphthol solution either with a dilute acid or with ammonia salt, (sal-ammoniac, ammonia sulfate, &c.)

The dyestuffs thus obtained are brown-violet powders, soluble in water and alcohol with a violet-blue color, in concentrated sulfuric acid with a green color, and quite insoluble in ether and benzene. The dilute aqueous solutions become green blue on addition of ammonia. Fixed alkalies give in aqueous solutions a green-blue tint or precipitate which is little soluble or nearly insoluble in ether.

Having now described my invention, what I claim is—

1. The herein-described process of manufacturing blue basic safranin dyestuffs soluble in water, which consists in allowing one molecule of beta-naphthol to act upon two molecules of a diazotized asymmetric dialkylsafranin, substantially as set forth.

2. As a new product, the dyestuff obtained by combining one molecule of beta-naphthol with two molecules of the diazo compound resulting from the action of nitrous acid upon asymmetric dialkylsafranin, being a brown-violet powder, soluble in water and alcohol with a violet-blue color, in concentrated sulfuric acid with green color, quite insoluble in ether and benzene, the dilute aqueous solution on addition of ammonia giving a green-blue tint and on addition of fixed alkalies to the aqueous solution a green-blue tint or precipitate soluble with difficulty or almost insoluble in ether, substantially as set forth.

In testimony that I claim the foregoing as my invention I have signed my name in presence of two subscribing witnesses.

BENNO HOMOLKA.

Witnesses:
BERNHARD LEYDECKER,
WILHELM SCHAAB.